(12) United States Patent
Simpson

(10) Patent No.: US 6,320,147 B1
(45) Date of Patent: Nov. 20, 2001

(54) DUAL CONTACT MEMBRANE HORN SWITCH ASSEMBLY

(75) Inventor: James Jeffrey Simpson, Fairborn, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/473,288

(22) Filed: Dec. 28, 1999

(51) Int. Cl.[7] .................................................. H01H 1/10
(52) U.S. Cl. ............................................ 200/512; 200/517
(58) Field of Search ............................ 200/5 A, 314, 200/341, 512, 517, 61.54, 61.55

(56) References Cited

U.S. PATENT DOCUMENTS

| | | | |
|---|---|---|---|
| 4,605,828 | * 8/1986 | Gostomski, Jr. et al. | ........... 200/5 A |
| 4,675,787 | * 6/1987 | Suwa | ..................... 361/401 |
| 4,934,735 | 6/1990 | Embach . | |
| 5,193,669 | * 3/1993 | Demeo et al. | ........................ 200/512 |
| 5,265,904 | 11/1993 | Shelton et al. . | |
| 5,369,232 | * 11/1994 | Leonelli | ............................. 200/61.54 |
| 5,399,819 | * 3/1995 | Lang et al. | .......................... 200/61.54 |
| 5,569,893 | * 10/1996 | Seymour | ............................. 200/61.54 |
| 5,575,498 | * 11/1996 | Elqadah et al. | ....................... 280/731 |
| 5,639,998 | * 6/1997 | Ricks et al. | ........................ 200/61.54 |
| 5,684,283 | * 11/1997 | Hambleton, Jr. et al. | ........ 200/61.08 |
| 5,723,834 | * 3/1998 | Hambleton, Jr. et al. | ........ 200/61.54 |
| 5,856,646 | * 1/1999 | Simon | ................................... 200/600 |
| 6,079,734 | * 6/2000 | Porter | ................................. 280/728.3 |

* cited by examiner

Primary Examiner—Paula Bradley
Assistant Examiner—Nhung Nguyen
(74) Attorney, Agent, or Firm—Kathryn A. Marra

(57) ABSTRACT

Advantageously, the present invention is directed to a membrane horn switch assembly designed so that a steering wheel cover can expand or contract due to extremes in temperature without the unintentional closing of a circuit used to activate a remote horn. Also the membrane horn switch is designed so that a space between concentrators on either the steering wheel cover or a reaction plate is minimized thereby requiring less exerted pressure on the steering wheel cover to actuate the switch. Additionally, the steering wheel cover is designed so that a greater deflection in the cover results when using the same amount of pressure as was previously exerted on the cover.

25 Claims, 9 Drawing Sheets

DUAL CONTACT MEMBRANE HORN SWITCH ASSEMBLY

TECHNICAL FIELD

The present invention relates to a membrane horn switch assembly and, more particularly, to a dual contact membrane horn switch assembly which will not activate the vehicle horn when the cover expands or contracts due to extremes in temperature.

BACKGROUND OF THE INVENTION

This invention relates to a membrane horn switch assembly for a driver side supplemental inflatable restraint (SIR) system. Driver side SIR systems typically include an air bag stored in a housing module. SIR systems are designed to actuate upon sudden deceleration so as to rapidly deploy an air bag in order to restrain the movement of the driver. A driver side SIR system is normally positioned under a steering wheel cover within a hub of a steering wheel. Traditionally, this is where a membrane horn switch is also located. Driver side SIR systems have therefore been adapted to include the membrane horn switch.

Driver side SIR systems are conventionally mounted on the steering wheel along with the membrane horn switch. As is known, the membrane horn switch generally comprises a dielectric substrate, a flexible membrane extending parallel to the substrate and a separator that is inserted between opposing surfaces of the membrane and the substrate. Circuit conductors are provided on the opposing surfaces of the membrane and the substrate. Pressure on the membrane horn switch pushes the conductors together to close a horn circuit that the membrane horn switch is connected to in order to actuate a remote horn. When the flexible membrane that carries the movable contact is deformed, it moves towards a fixed contact on the substrate and upon physically touching the fixed contact, the electrical switch connection is made and the horn is actuated. Upon release of the pressure, the circuit is broken and the horn is silenced.

Membrane horn switches require some form of a rigid base to be compressed against. Having the SIR system and the membrane horn switch located within the steering wheel hub calls for the components that make up the SIR system and the membrane horn switch to be tightly packed. When the membrane horn switch is tightly packed between a folded air bag cushion and the steering wheel cover, it is susceptible to inadvertent actuation. This inadvertent actuation could occur with a minor accidental bumping of the steering wheel cover or with a temperature related compression on the steering wheel cover caused by the expansion or contraction of the integrated parts due to extremes in temperature. For example when the temperature is very cold, the steering wheel cover could contract without any pressure exerted on it by the vehicle driver. The temperature related contraction of the steering wheel cover would therefore cause the switch to react in the way it responds when the driver exerts pressure on the steering wheel cover. In other words, the horn will sound because the conductive surfaces on the substrate and the flexible membrane are forced together to complete the horn circuit. However, unlike actuation of the horn by hand pressure, the contraction that takes place due to the extreme cold temperature causes the horn switch to remain in the contracted position in which the conductive surfaces are in contact until the temperature rises causing the cover to expand to its original position in which the conductive surfaces are separate from one another. This results in the constant sound of the horn in cold temperatures.

Another consideration in designing membrane horn switches is the amount of pressure needed to actuate the membrane horn switch. It is therefore desirous to have a membrane horn switch that can be activated with a consistent minimal pressure. However, orienting the conductive surfaces close together as is needed for minimal contact actuation also has the added risk of the unintentional closing of the circuit or sounding of the horn. Accordingly, in order to ensure that the conductive surfaces are not so close as to accidentally activate the switch, the conductive surfaces of the conventional membrane horn switches are spaced further apart so that a greater amount of pressure on the steering wheel cover is needed to force the conductive surfaces together closing the circuit and thereby actuating the vehicle horn.

It is therefore desirable to provide a dual contact membrane horn switch assembly that when exposed to extremes in temperature will not trigger actuation of the switch and thereby sound the vehicle's horn. In addition, it is desirous to provide a dual contact membrane horn switch assembly which requires consistent minimal pressure to close the circuit and thereby actuate the vehicle's horn.

SUMMARY OF THE INVENTION

Advantageously, the present invention is directed to a membrane horn switch assembly designed so that a steering wheel cover can expand or contract due to extremes in temperature without the unintentional closing of a circuit used to activate a remote horn. Also, the assembly includes a membrane horn gap which is designed so that the space between the cover or reaction plate concentrators and the switch is minimized thereby requiring less pressure exerted on the steering wheel cover to actuate the switch. Additionally, the steering wheel cover is designed so that a greater deflection in the cover results when using the same amount of pressure as was previously exerted on the cover.

In one embodiment, the membrane horn switch assembly of the present invention comprises a membrane horn switch having an upper flexible substrate sheet having a bottom surface coated with a conductive material, a lower flexible substrate sheet with a conductive positive and a negative grid disposed on a top surface thereof and a dielectric spacer interposed between the upper and lower flexible substrate sheets. The dielectric spacer partially defines a predetermined number of switch contact points where an electrical connection may be provided between the upper and lower sheets when assembled. Also included in the assembly is a steering wheel cover which may have any number of suitable steering wheel cover designs such as a one-shot design, two-shot design, etc. In one embodiment, the steering wheel cover is of a two-shot steering wheel cover design having a flexible outer portion and a rigid inner portion, where the membrane horn switch is disposed between the outer portion and the inner portion. The inner portion has a plurality of first and second concentrators integrally formed thereon. In this embodiment, the first and second concentrators comprise elongated members extending away from the inner portion of the steering wheel cover, wherein the first concentrators have a length that is greater than a length of the second concentrators.

With any downward movement (towards a driver side air bag) of the flexible outer portion of the steering wheel cover, the first concentrators formed on a top surface of the rigid inner surface of the steering wheel cover make contact with the membrane horn switch before the second concentrators because of the differing lengths thereof. The first concentrators are oriented and aligned so that they contact either the conductive positive or the negative grid which are preferably interleaved with one another. Likewise, the second concentrators are oriented so that they contact the conductive grid not contacted by the first concentrators when the steering wheel cover is further depressed. In this manner, whenever the steering wheel cover is minimally driven downward, either by contraction due to extremely cold temperature or by an accidental bumping with minimal force, only the first concentrators would contact the switch thereby forcing only selective areas of the conductive material with one of the positive and negative conductive grids. For purpose of illustration only, the first concentrators are described and shown as being orientated to contact the conductive positive grid. Without the subsequent electrical connection between the conductive material and the conductive negative grid, the electrical circuit used to activate the horn is not closed and therefore the horn will not sound absent the electrical conduction between the conductive material and the conductive negative grid. In other words, additional pressure is required on the steering wheel cover to complete the circuit and sound the horn by electrically connecting the conductive material and the positive and negative grids.

In a second embodiment, the first and second concentrators are integrally formed on a bottom surface of the outer portion of the steering wheel cover, and as described above, the first concentrators are oriented so that they contact one of the positive and negative conductive grids and the second concentrators are oriented so that they contact the other of the positive and negative conductive grids. In the second embodiment, the membrane horn switch is also disposed between the flexible outer portion and the rigid inner portion of the steering wheel cover. Thus, an initial downward force exerted on the outer portion of the steering wheel cover forces the first concentrators into contact with the membrane horn switch resulting in the conductive surface being placed in intimate contact with one of the positive and negative conductive grids which is aligned with the first concentrators. An additional downward force is needed to force the second concentrators into contact with the membrane horn switch causing the conductive material to contact the other of the positive and negative conductive grids. The subsequent contact between the conductive material and the other of the positive and negative conductive grids closes the circuit and actuates the vehicle's horn. In another embodiment, the membrane horn switch assembly includes a reaction plate or back plate which is disposed between the upper surface of the inner cover of the steering wheel cover and the membrane horn switch. In this embodiment, the reaction plate has the first and second concentrators formed thereon and is securely coupled to the membrane horn switch so that both may be conveniently placed within the steering wheel cover.

As mentioned above, the membrane horn switch of the present invention may also be used in a membrane horn switch assembly that includes a one-shot steering wheel cover. When using a one-shot steering wheel cover, a back plate is preferably provided in the assembly and is analogous to and functions similar to the rigid inner portion of the alternative two-shot steering wheel cover design. In one exemplary embodiment, the membrane horn switch is utilized in a membrane horn switch assembly that comprises a two-shot steering wheel cover, wherein the rigid inner portion is integrally formed with a predetermined number of first and second concentrators. It being understood that the membrane horn switch of the present invention may be used with a number of steering wheel cover designs. For example, the membrane horn switch assembly can also be utilized in a vehicle having a urethane steering wheel cover.

According to the present invention, the membrane horn switch has a predetermined datum scheme (i.e., pattern of the first and second concentrators) to register switch contact points so that the first and second concentrators are properly orientated relative to the conductive positive and negative grids. This method of registration eliminates dielectric interference in the membrane horn switch. Dielectric interference is one cause of malfunctioning of the membrane horn switch due to improper alignment and contact between layers comprising the membrane horn switch. Furthermore, the membrane horn switch assembly also has locating features which further permit the desired registration of the switch contact points. In addition and advantageously, the membrane horn switch of the present invention is designed so that temperature extremes and inadvertent bumping of the steering wheel cover does not result in the unintentional activation of the membrane horn switch.

The above and other objects and advantages of the invention will be apparent from the following description, the accompanying drawings and the appended claims.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
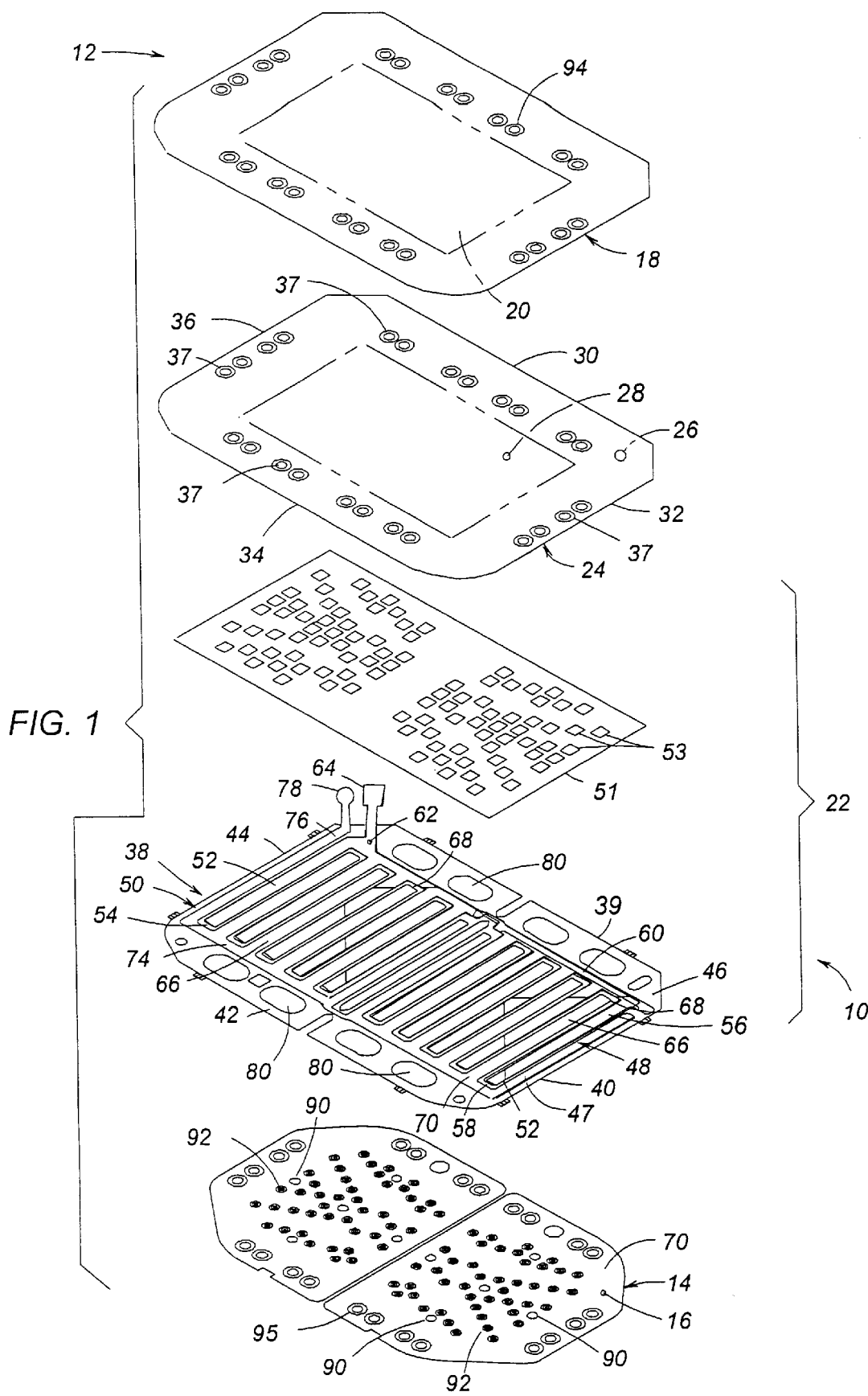
FIG. 1 is an exploded perspective view of a dual contact membrane horn switch assembly embodying the present invention.
Figure 4:
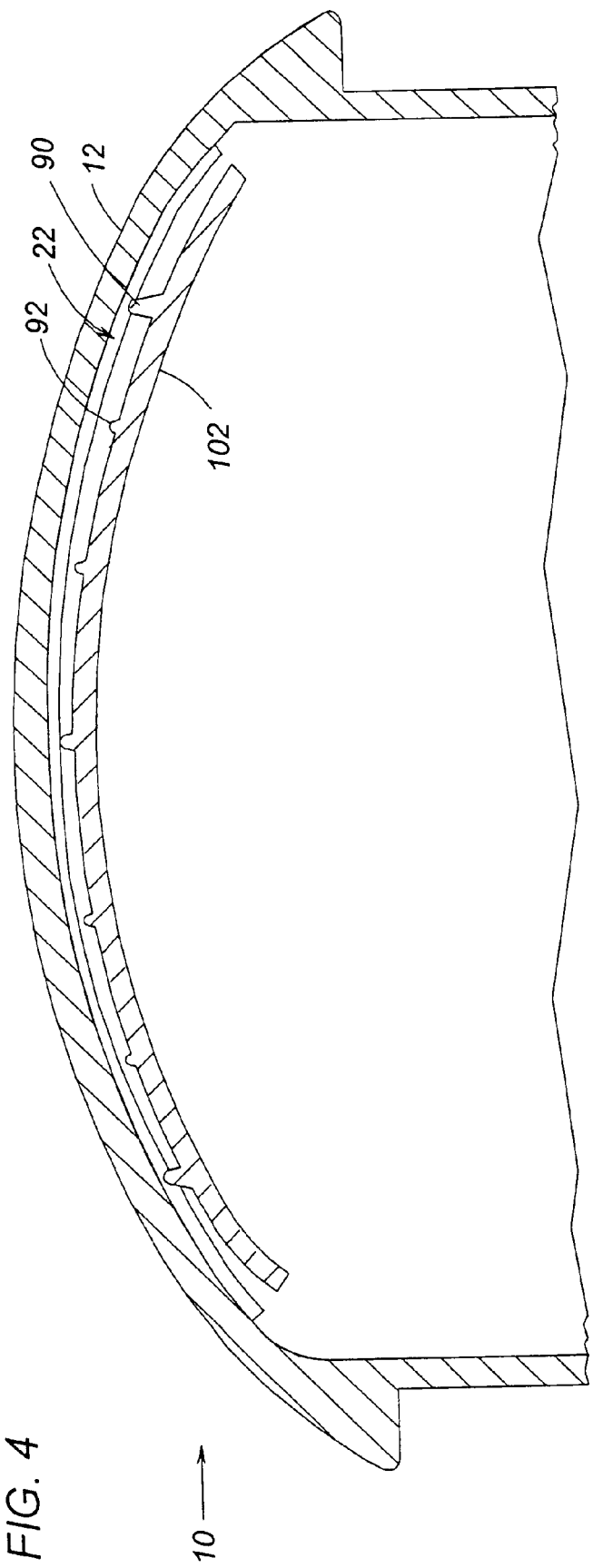
FIG. 4 is a cross sectional side elevational view of the dual contact membrane horn switch assembly according to a third embodiment of the present invention.

Referring now to FIG. 1, a dual contact membrane horn switch assembly according to a first embodiment of the present invention is illustrated and generally indicated at 10. FIG. 1 illustrates the membrane horn switch assembly 10 including a steering wheel cover 12. In the exemplary and illustrated embodiment, the cover 12 has a two-shot design in which the cover 12 is formed of a two-shot molded construction. More specifically, the cover 12 includes an inner portion 14 having an upper surface 16 and an outer portion 18 having a lower surface 20. It being understood that the two-shot design of cover 12 is merely exemplary in nature and it will be appreciated that other cover designs may be used with the membrane horn switch 10 of the present invention. For example and as is illustrated in FIG. 4, the cover 12 may be formed from a one-shot construction of a semi-rigid yet resilient material as will be described in greater detail hereinafter.

The membrane horn switch 10 includes a membrane horn switch 22 which in one exemplary embodiment is disposed intermediate the inner portion 14 and the outer portion 18 of the steering wheel cover 12. The membrane horn switch 22 is formed of an upper nonconductive sheet 24 which includes a bottom surface 26 substantially coated with a conductive material, generally indicated at 28. In the illustrated embodiment, the upper nonconductive sheet 24 is rectangular in shape and is defined by the edges 30, 32, 34, 36. The upper nonconductive sheet 24 further includes a plurality of openings 37 formed therein in predetermined locations thereof. Preferably, the plurality of openings 37 are formed between a peripheral edge of the conductive material 28 and one of edges 30, 32, 34, 36. In the illustrated embodiment, the plurality of openings 37 are formed in pairs such that the pairs are formed between the peripheral edge of conductive material 28 and the edge 30 and opposing pairs are formed between the peripheral edge of the conductive material 28 and the edge 34. In the exemplary embodiment, each of openings 37 has a circular shape and is designed to receive a fastener or locating member which is designed to properly orient the components of the assembly 10 relative to each other.

The membrane horn switch 22 further comprises a lower nonconductive sheet 38 which preferably has a complementary shape as the upper nonconductive sheet 24 and is thus generally rectangular in shape and is defined by edges 39, 40, 42, 44. The lower nonconductive sheet 38 has a top surface 46 in which a conductive positive grid 48 and a conductive negative grid 50 are formed thereon. The lower nonconductive sheet 38 also has a bottom surface 47 opposite the top surface 46. The membrane horn switch 22 further includes a 25 nonconductive spacer 51 which is disposed intermediate the upper nonconductive sheet 24 and the lower nonconductive sheet 38. The nonconductive spacer 51 may comprise any number of members including a dielectric sheet having a complementary shape to the upper and lower nonconductive sheet 24, 38, respectively. The dielectric sheet includes a plurality of openings 53 formed therein and arranged according to a predetermined pattern. The nonconductive spacer 51 may also be formed by disposing a dielectric ink 55 on selected portions of the lower nonconductive sheet 38 and more specifically, the dielectric ink is disposed on the conductive positive and negative grids 48, 50 to define a dielectric pattern. When using this technique, the dielectric ink is not formed on selected areas of the conductive positive and negative grids 48, 50 so that gaps 53 are formed and defined where the dielectric ink is not disposed on the respective conductive positive and negative grids 48, 50. Any number of other suitable techniques may be used so long as a dielectric material is disposed on or above the conductive positive and negative grids 48, 50 such that the openings or gaps 53 are formed and provide selective points of electrical communication between the conductive material 28 and the conductive positive and negative grids 48, 50.

In an exemplary embodiment, as shown in FIG. 1, the conductive positive grid 48 and the conductive negative grid 50 are interleaved with each other and lie in the same plane; however, the conductive grids 48, 50 are formed such that contact is prevented therebetween. More specifically, the conductive positive grid 48 includes a plurality of conductive positive arms 52 each having a first end 54 and an opposing second end 56. The arms 52 are orientated so that the first ends 54 align and the second ends 56 align so that any two arms 52 lie parallel to each other and are separated by a first gap 58. The conductive positive arms 52 are interconnected by a common positive link 60 orientated generally perpendicular to the conductive positive arms 52 at the first ends 54 thereof. The common positive link 60 is substantially parallel to one edge 39 of the lower nonconductive sheet 38. One portion of the conductive positive grid 48 terminates at a positive terminal 62 to which a positive lead wire 64 is electrically connected thereto.

The conductive negative grid 50 is formed on the lower nonconductive sheet 38 so that the conductive negative grid 50 includes a plurality of conductive negative arms 66. Each conductive negative arm 66 includes a first end 68 and an opposing second end 70 being orientated so that the first ends 68 align and the second ends 70 align so that any two negative arms 66 lie parallel to one another and are separated by a second gap 72. The negative arms 66 are interconnected by a common negative link 74 orientated substantially perpendicular to the negative arms 66 at the second ends 70 thereof. The common negative link 74 lies substantially parallel to another edge 38 which opposes and is substantially parallel to edge 42. One portion of the conductive negative grid 50 terminates at a negative terminal 76 to which a lead wire 78 is electrically connected thereto.

As shown in FIG. 1, the conductive positive grid 48 and the conductive negative grid 50 are orientated relative to each other so that the plurality of conductive positive arms 52 and the plurality of conductive negative arms 66 are interleaved with respect to one another. In the illustrative embodiment, an outermost conductive positive arm 52 is disposed proximate to the edge 40 and an outermost conductive negative arm 66 is disposed within the first gap 58 between the outermost conductive positive arm 52 and a next adjacent conductive positive arm 52. Accordingly, the conductive negative arm 66 which is disposed closest to the negative terminal 76 is disposed proximate to the edge 44 and the conductive positive arm 52, which is disposed closest to positive terminal 62, is disposed between next adjacent conductive negative arms 66.

Similar to the upper nonconductive sheet 24, the lower nonconductive sheet 38 includes a plurality of openings 80. In the illustrated embodiment, the plurality of openings 80 are formed in pairs such that two pairs are formed between the peripheral edge of conductive positive link 60 and the edge 39 and two opposing pairs are formed between the peripheral edge of the conductive negative link 74 and the edge 42. In the exemplary embodiment, each of openings 80 has an elongated shape and is axially aligned with a pair of corresponding openings formed in the other sheets comprising assembly 10.

In assembling the membrane horn switch 22, the conductive material 28 of the upper nonconductive sheet 24 is positioned so that it faces the conductive positive and negative grids 48, 50, respectively, of the lower nonconductive sheet 38. The nonconductive spacer 51 is disposed between the two conductive surfaces, namely conductive material 28 and the conductive grids 48, 50 so that in a normal default position, the conductive surfaces 28, 48, 50 are separated from each other and pressure is needed to force the conductive surfaces 28, 48, 50 into contact with each other. The plurality of openings 53 formed in the nonconductive spacer 51 permit the conductive material 28 to selectively contact the conductive positive and negative grids 48, 50, respectively, when the conductive material 28 is pressed downward towards the lower nonconductive sheet 38. In other words, the electrical contact between the conductive surfaces 28, 48, 50 is made through the plurality of openings or gaps 53.

The steering wheel cover 12 is designed so that it also has a plurality of recesses 94 formed therein. More specifically, recesses 94 may be formed in the outer portion 18 respectively and preferably, the plurality of recesses 94 are axially aligned with the plurality of openings 37, 80 so that retaining or locating pins 95 may be inserted therethrough during the construction of assembly 10 so that the respective components are properly positioned relative to each other. The retaining pins 95 may be integrally formed as part of the inner portion 14 such that the retaining pins 95 extend through the openings 80 and 37 and into recesses 94 so as to locate and secure the membrane horn switch 22 between the outer portion 18 and the inner portion 14 as will be described in greater detail hereinafter. It being understood that it is within the scope of the present invention that other retaining features may be used.

As shown in the Figures according to a first embodiment, the top surface 16 of the rigid inner portion 14 of the steering wheel cover 12 is integrally formed with a plurality of first concentrators 90 and a plurality of second concentrators 92. In the exemplary embodiment, the plurality of first and second concentrators 90, 92, respectively, comprise elongated members which extend upwardly away from the top surface 16 of the inner portion 14. Preferably, the plurality of first and second concentrators 90, 92 are formed perpendicular to the top surface 16. According to the present invention, the plurality of first concentrators 90 have a length greater than a length of the plurality of second concentrators 92. The plurality of first and second concentrators 90, 92, respectively, extend outwardly from the top surface 16 of the rigid inner portion 14 of the steering wheel cover 12. The first and second concentrators 90, 92 are arranged according to a predetermined pattern designed so that pressure exerted against the outer portion 18 of the steering wheel cover 12 causes the upper nonconductive sheet 24 and more specifically, the conductive material 28 formed thereon, to selectively contact one of the conductive positive and negative grids 48, 50 at selective points. This results because the plurality of first and second concentrators 90, 92 are arranged on the top surface 16 so that the plurality of first concentrators 90 are disposed below only one of the conductive positive and negative grids 48, 50, respectively. By associating the plurality of first concentrators 90 to one of the conductive positive and negative grids 48, 50, the conductive material 28 will first make contact with the associated conductive grid 48, 50 because of the increased length of the plurality of first concentrators 90 relative to the length of the second concentrators 92. It will be appreciated that either the conductive positive or negative grid 90, 92 may be associated with the plurality of first concentrators 90 depending upon whether it is desired for the conductive material to first contact the conductive positive grid 90 or the conductive negative grid 92. For purposes of explanation and ease of illustration, it will be described and shown that the conductive positive grid 48 contacts the conductive material 28 when an initial force is placed against the outer portion 18 of the steering wheel cover 12 causing compression of the membrane horn switch 22. In other words, the plurality of first concentrators 90 are associated with and disposed below the conductive positive grid 48.

The sequential rather than the simultaneous contact of the conductive positive grid 48 with the conductive material 28 and then the conductive negative grid 50 with the conductive material 28 occurs because of the orientation of the plurality of first concentrators 90 and the second concentrators 92 on the top surface 16 of the rigid inner portion 14 of the steering wheel cover 12 and because of the respective lengths of the plurality of first and second concentrators 90, 92. As shown in FIG. 1, depicting an exemplary embodiment, there are a select number of first concentrators 90 positioned on the rigid inner portion 14 of the steering wheel cover 12 in contrast with a greater number of second concentrators 92. The number of first and second concentrators 90, 92 respectively can vary depending on the application and is not critical so long as the proper alignment is provided between the first concentrators 90 and the conductive positive grid 48. Additionally, the precise height of the plurality of first and second concentrators 90, 92 can vary so long as the length of one is greater than the length of the other. In an exemplary embodiment each first concentrator has a length of approximately 1.3 millimeters and each second concentrator has a length of approximately 0.8 millimeters.

In this embodiment, the plurality of first concentrators 90 are appropriately spaced on the top surface 16 so that when pressure is exerted on the flexible outer portion 18 of the steering wheel cover 12, the conductive positive grid 48 and the conductive negative grid 50 are initially displaced towards the top surface 16 of the rigid inner portion 14 of the steering wheel cover 12 in an even manner. In other words, the first concentrators 90 are distributed to evenly support the lower nonconductive sheet 38 preferably at a perimeter vicinity so that a small deflection of the steering wheel cover 12 will result in the plurality of first concentrators 90 abutting the membrane horn switch 22. As a result, the plurality of first concentrators 90 cause the conductive material 28 to selectively make contact with the conductive positive grid 48 at selected points where the plurality of first concentrators 90 are located and where the openings 53 are formed in the nonconductive spacer 51.

However and in accordance with the present invention, any small deflection of the steering wheel cover 12 will not be sufficient to allow the plurality of second concentrators 92 to contact the membrane horn switch 22. As a result, additional pressure on the flexible outer surface 18 of the steering wheel cover 12 is necessary to cause blowing of the membrane horn switch 22 about the plurality of first concentrators 90 so that the conductive material 28 contacts the conductive negative grid 50 thereby closing the electrical circuit and activating the vehicle's horn. When the pressure is released from the steering wheel cover 12, the plurality of second concentrators 92 break contact with the membrane horn switch 22 before the plurality of first concentrators 90. Systematically, the conductive negative grid 50 separates from the conductive material 28 causing the circuit to open and thereby deactivate the vehicle's horn.

Figure 2:
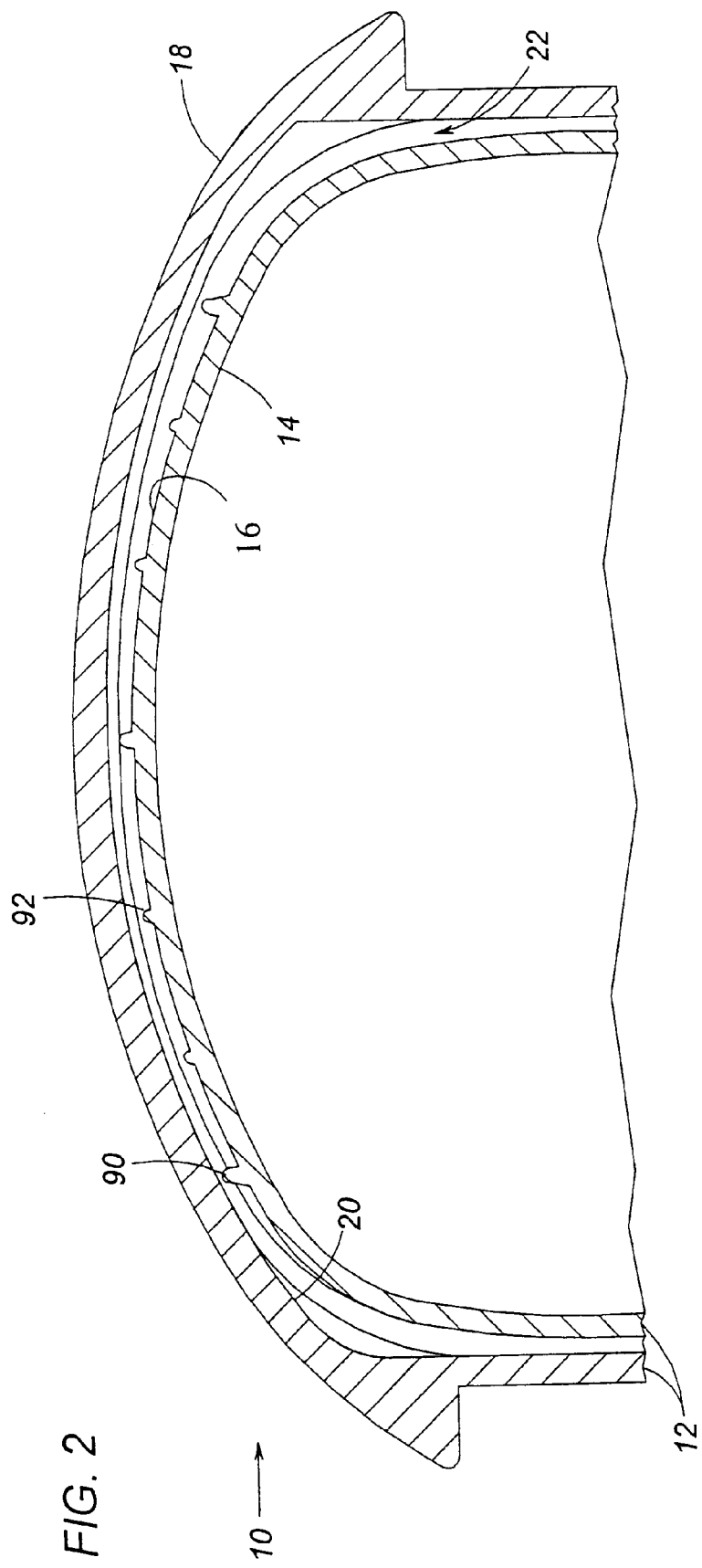
FIG. 2 is cross sectional side elevational view of an alternative embodiment of the dual contact membrane horn switch assembly of FIG. 1 shown in an assembled state.

FIG. 2 is a cross-sectional side elevational view illustrating an alternative embodiment of the membrane horn switch assembly 10 of FIG. 1 in an assembled state and is otherwise self-explanatory.

Figure 3:
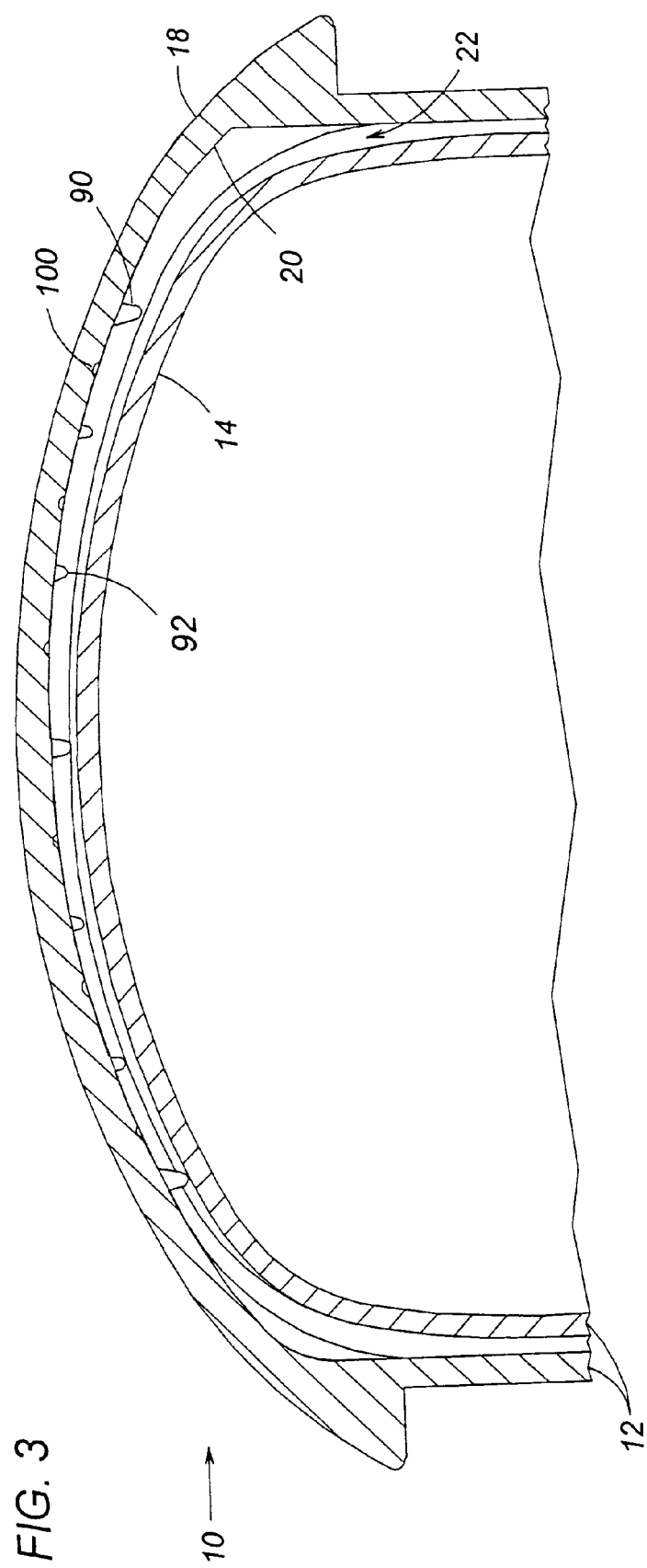
FIG. 3 is a cross sectional side elevational view of the dual contact membrane horn switch assembly according to a second embodiment of the present invention.

In a second embodiment shown in FIG. 3, the plurality of first and second concentrators 90, 92, respectively, are formed on the bottom surface 20 of the flexible outer portion 18 of the steering wheel cover 12. Utilizing a two-shot steering wheel cover 12 and working in the same manner as described above, the plurality of first and second concentrators 90, 92, respectively, are preferably integrally formed on the bottom surface 20 of the flexible outer portion 18 of the steering wheel cover 12. For purposes of illustration and referring also to FIG. 1 for illustration of the membrane horn switch 22, the plurality of first concentrators 90 align with the conductive positive grid 48 of the membrane horn switch 22 and the plurality of second concentrators 92 align with the conductive negative grid 50. Therefore, when a small force is exerted on the flexible outer portion 18 of the steering wheel cover 12, the plurality of first concentrators 90 are directed downwards towards the membrane horn switch and make contact with the membrane horn switch 22. On a side opposite to the outer portion 18, the membrane horn switch 22 is disposed adjacent to the inner portion 14 which limits the downward movement of the membrane horn switch 22 when the outer portion 18 is depressed. The initial force against the outer portion 18 causes the conductive material 28 and the conductive positive grid 48 to make contact because of the alignment of the plurality of first concentrators 90 with the conductive positive grid 48. Additional pressure on the flexible outer portion 18 of the steering wheel cover 12 is needed in order for the plurality of second concentrators 92 to make contact with the membrane horn switch 22 forcing the conductive material 28 into contact with the conductive negative grid 50 thereby closing the circuit and activating the vehicle's horn.

Shown in FIG. 3, as an additional benefit, the bottom surface 20 of the flexible outer portion 18 of the steering wheel cover 12 may include a quantity of notches 100 formed among the plurality of first and second concentrators 90, 92, respectively. With the notches 100 in place, a driver would need to exert less force on the flexible outer portion 18 of the steering wheel cover 12 in order to result in the same amount of deflection of the plurality of second concentrators 92 if the flexible outer portion 18 of the steering wheel cover 12 did not include the quantity of notches 100. This occurs because a decreased resistance to bending is created in the bottom surface 20 where the material is removed to form the notches 100. Less deflection is required to activate the membrane horn switch 22 because of the decreased resistance to bending of the flexible outer cover 18 due to the location of the integrally formed plurality of first and second concentrators 90, 92.

FIG. 4 shows a third embodiment of the present invention. As previously mentioned, any number of steering wheel covers of varying designs are suitable for use with the present invention. For example and as illustrated in FIG. 4, the steering wheel cover 12 may have a one-shot construction. In this embodiment, the membrane horn switch assembly 10 includes a reaction plate 102 when using a one-shot steering wheel cover 12, wherein the membrane horn switch 22 is disposed between the cover 12 and the reaction plate 102. The membrane horn switch 22 for use in the one-shot construction is preferably of the same construction as the membrane horn switch 22 used in the two-shot construction.

Figure 5:
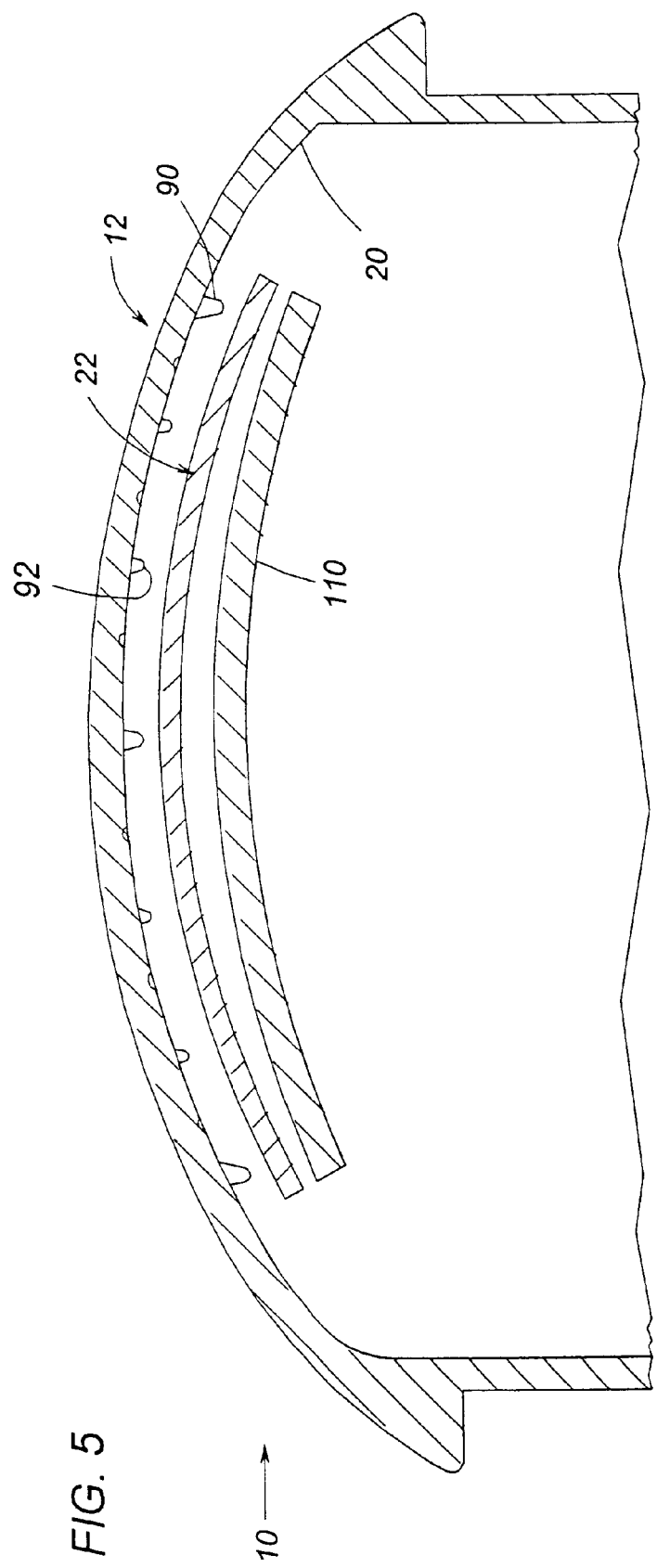
FIG. 5 is a cross sectional side elevational view of the dual contact membrane horn switch assembly according to a fourth embodiment of the present invention.

Referring also to FIG. 1 for illustration of the membrane horn switch 22. In the exemplary embodiment, the reaction plate 102 has the plurality of first and second concentrators 90, 92, respectively, integrally formed therewith so that the plurality of first concentrators 90 align with one of the conductive positive and negative grids 48, 50. For purposes of illustration, the plurality of first concentrators 90 aligns with the conductive positive grid 48 and the plurality of second concentrators 50 align with the conductive negative grid 50. Therefore, when minimal pressure is exerted on the steering wheel cover 12 having the illustrated one-shot construction, the plurality of first concentrators 90 first contact the conductive positive grid 48. Additional pressure exerted against the steering wheel cover 12 is needed for the membrane horn switch 22 to deflect sufficiently so that the plurality of second concentrators 72 contact the conductive negative grid 50 and direct the conductive negative grid 50 into contact with the conductive material 28 to thereby close the circuit and activate the vehicle's horn. Referring now to FIGS. 1 and 5. FIG. 5 also illustrates a steering wheel cover 12 with a one-shot construction of a different configuration than the one-shot construction shown in FIG. 4. In this embodiment, the membrane horn switch assembly 10 comprises the steering wheel cover 12, the membrane horn switch 22 and a reaction plate 110. The plurality of first and second concentrators 90, 92, respectively, are integrally formed on and extend from the bottom surface 20 of the one-shot construction steering wheel cover 12. The plurality of first concentrators 90 formed on the bottom surface 20 are aligned with the conductive positive grid 48 and the plurality of second concentrators 92 are aligned with the conductive negative grid 92. When a minimal force is exerted on the steering wheel cover 12, the cover 12 deflects driving the plurality of first concentrators 90 into contact with the upper nonconductive sheet 24 of the membrane horn switch 22 thereby forcing the conductive material 28 on the bottom surface 26 thereof into contact with one of the conductive positive and negative grids 48, 50, respectively, (preferably the conductive positive grid 48). Additional force is needed to drive the plurality of second concentrators 92 into contact with the upper nonconductive sheet 24 of the membrane horn switch 22 thereby forcing the conductive material 28 into contact with the other of the conductive positive and negative grids 48, 50, respectively, (preferably the conductive negative grid 50) thereby closing the circuit and activating the vehicle's horn.

Figure 6:
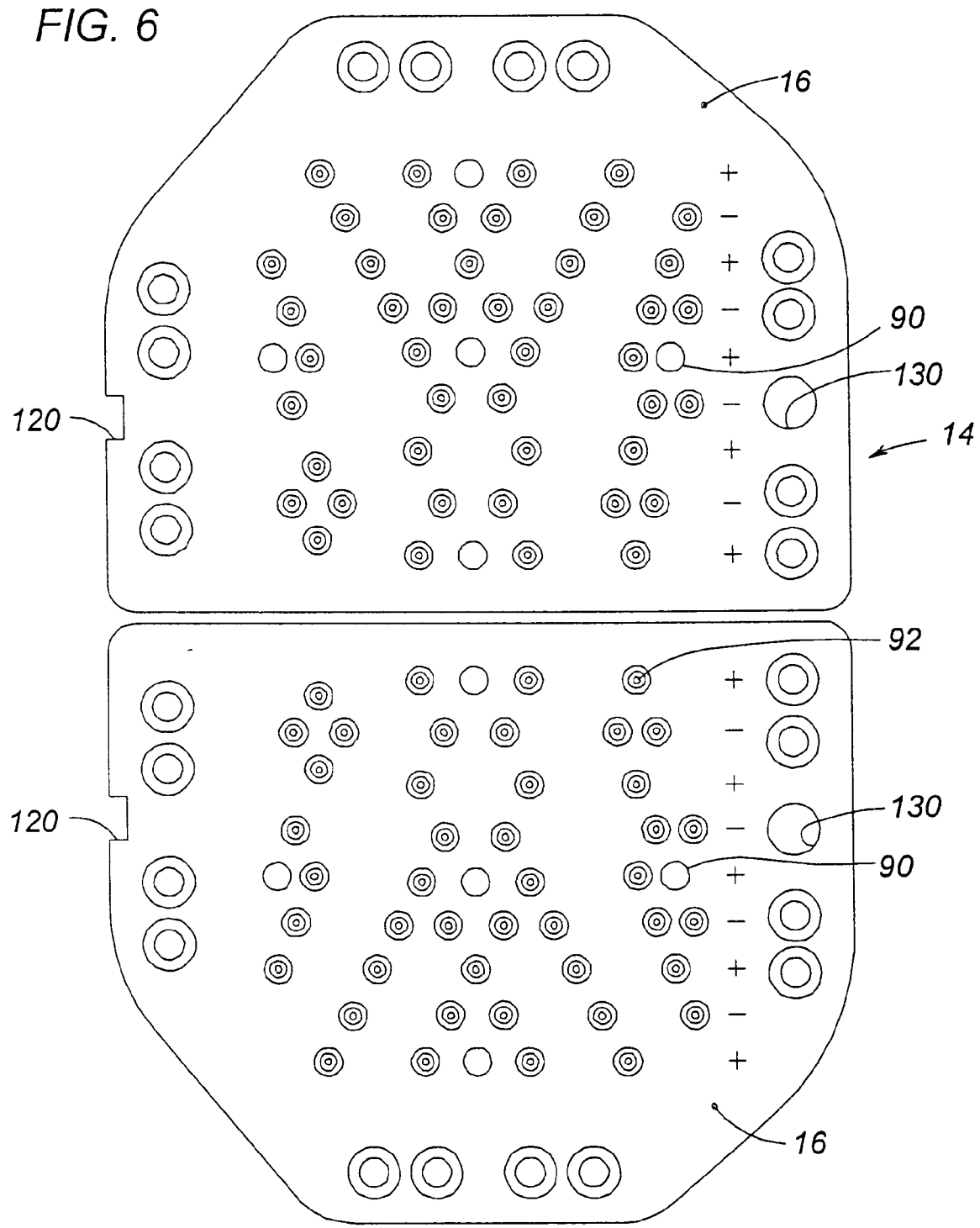
FIG. 6 is a top plan view of an exemplary inner portion of a two-shot steering wheel cover having first and second concentrators formed thereon according to the present invention.

FIG. 6 is an enlarged view of the inner portion 14 of the steering wheel cover 12 illustrating one exemplary configuration for the plurality of first and second concentrators 90, 92, respectively. Referring to FIGS. 1 and 6, there is a predetermined quantity of first concentrators 90 distributed so as to make contact with the conductive positive grid 48 at selective locations. It being understood that the number of first concentrators 90 may vary and accordingly FIG. 6 shows one possible configuration of the plurality of first concentrators 90 and the plurality of second concentrators 92. It being appreciated that the configurations and quantity of first and second concentrators 90, 92 used depends on the application and are too numerous to list so long as the plurality of first concentrators 90 is specifically aligned with one of the conductive positive and negative grids 48, 50, preferably the conductive positive grid 48. The inner portion 14 preferably includes a member 120 which acts as an anti-rotation device which prevents the switch or plate from rotating. The member 120 may comprise any number of members, including but not limited to notches formed in the steering wheel cover 12 or a physical tab which extends upwardly therefrom to prevent rotation of the membrane horn switch 22 (FIG. 1). The inner portion 14 also includes a primary datum 130 formed therein which serves to locate the respective components of the assembly 10 (FIG. 1). In the illustrated embodiment, the primary datum 130 comprises a locating member which is designed to be received within openings 80, 37, 94 to locate and secure the membrane horn switch 22. The primary datum 130 permits the individual components of the assembly 10 to be properly located relative to each other and thus simplifies the overall assembly process.

Figure 7:
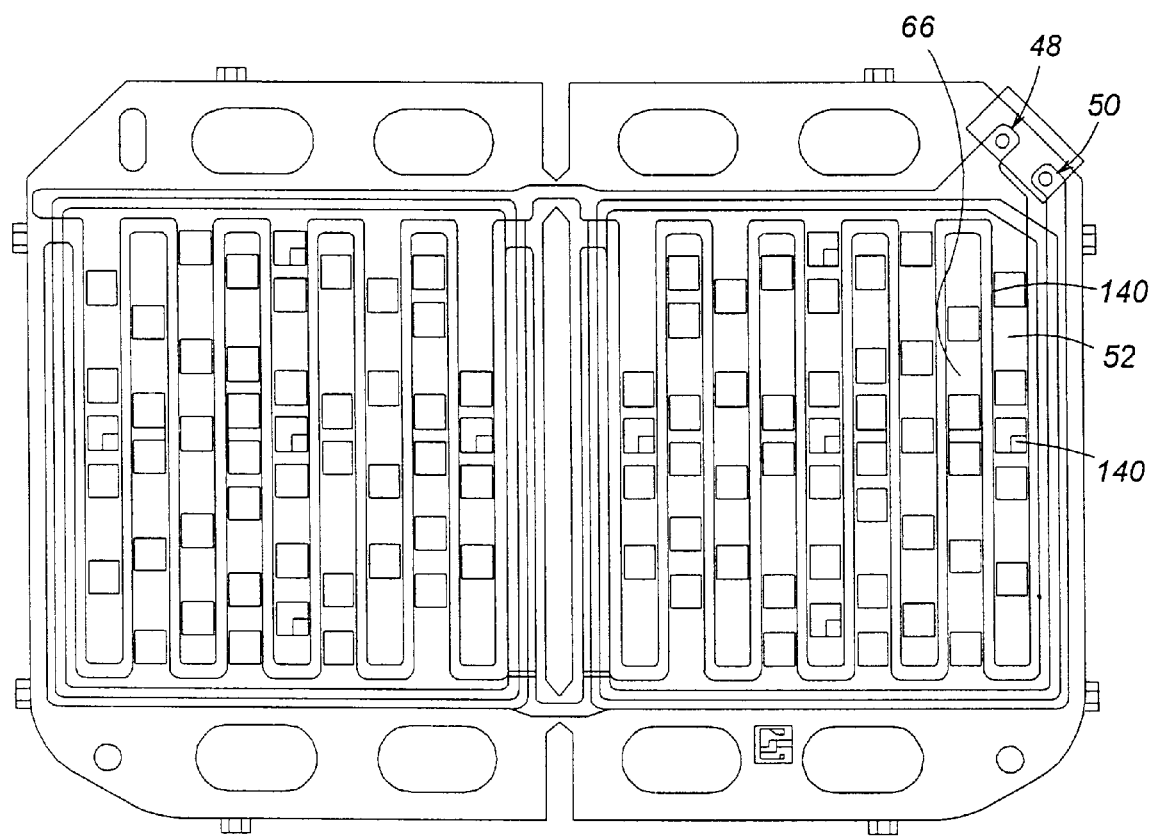
FIG. 7 is a top plan view of a partially assembled membrane horn switch including a lower nonconductive sheet and a non-conductive spacer disposed thereon according to the present invention.

Referring now to FIGS. 1 and 7 an exemplary lower nonconductive sheet 14 including the conductive positive grid 48 and the conductive negative grid 50. Also shown is the nonconductive spacer 51 which in this embodiment comprises a dielectric ink 55 selectively disposed on the conductive positive and negative grids 48, 50. The dielectric ink is laid down so that openings 53 (or gaps in the dielectric ink pattern) are defined and arranged so that the plurality of first and second concentrators 90, 92 (FIG. 1) are disposed either above or below the openings 53 such that a plurality of contact surfaces 140 exists on the conductive positive grid 48 and the conductive negative grid 50. The plurality of contact surfaces 140 are defined by the openings 53 formed in the nonconductive spacer 51. The plurality of contact surfaces 140 are also defined by the plurality of first and second concentrators 90, 92 because the plurality of first and second concentrators 90, 92 are aligned with the openings 53 so that the plurality of first and second concentrators 90, 92 directs the respective conductive positive and negative grid 48, 50 through the openings 53 and into contact with the conductive material 28. Thus, the size of the contact surfaces 140 is generally the size of openings 53, wherein the openings 53 and the contact surfaces 140 generally correspond in size to the size of the plurality of first and second concentrators 90, 92. Accordingly, the plurality of contact surfaces 140 comprise contact surfaces providing electrical contact between the conductive material 28 and both the conductive positive and negative grids 48, 50. As previously noted, the plurality of first and second concentrators 90, 92 may be formed either on the inner portion 14 of the steering wheel cover 12 or they may be formed as part of a reaction plate as shown in FIG. 8 and described hereinafter.

Figure 8:
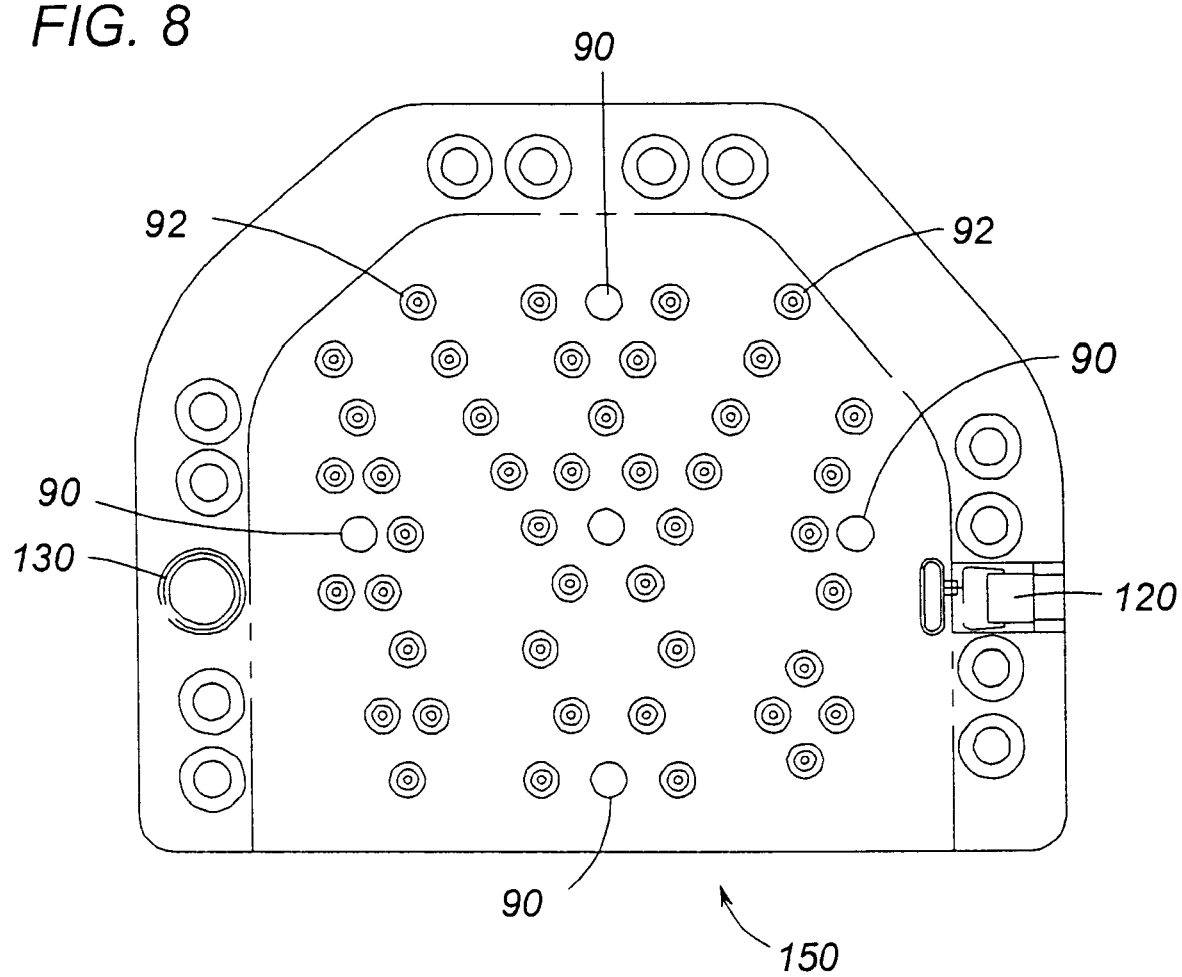
FIG. 8 is a top plan view of a reaction plate having first and second concentrators extending therefrom for use in the membrane horn switch according to the present invention.
Figure 9:
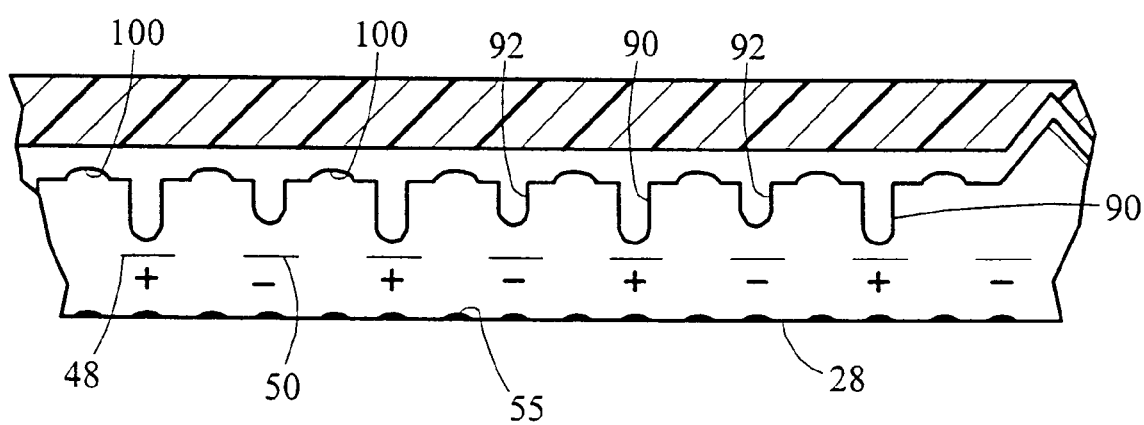
FIG. 9 is a partial cross sectional view of the dual membrane switch illustrating alternative embodiments.

Now referring to FIGS. 1 and 8 in which an exemplary reaction plate is shown and generally indicated at 150. Reaction plate 150 is generally for use with the membrane horn switch 22 of FIG. 1 and is designed so that the plurality of first and second concentrators 90, 92 are preferably integrally formed as part of the reaction plate 150 and extend upwardly from an upper surface 152 thereof. The reaction plate 150 includes member 120 and primary datum 130 formed therein to register the contact points 130 (FIG. 7) to the first and second concentrators 90, 92. In other words, the use of the member 120 and the primary datum 130 serve to eliminate dielectric interference within the membrane horn switch 22 by properly locating and aligning the plurality of first and second concentrators 90, 92 with respect to the contact points 130 (FIG. 7) so that deployment of the membrane horn switch 22 causes the desired contact between the conductive material 28 and the conductive positive and negative grids 48, 50 using the plurality of first and second concentrators 90, 92. In this embodiment, the reaction plate 150 is preferably designed so that it may be coupled to membrane horn switch 22 and then inserted within the steering wheel cover 12. Known retaining features may be formed on the reaction plate 150 and the membrane horn switch 22 to permit coupling between these components.

The reaction plate 150 is disposed between the membrane horn switch 22 and the lower portion 14 of the steering wheel cover 12, wherein the inner portion 14 comprises a substantially planar surface which receives the reaction plate 150. Thus, the reaction plate 150 seats against the top surface 16 of the inner portion 14. In this embodiment, the inner portion 14 preferably includes locating features which are designed to locate and position the reaction plate 150 and the membrane horn switch 22 relative to the steering wheel cover 12. For example, the inner portion 14 may have a predetermined number of locating members (e.g., pins) which are received within locating openings 156 formed in the reaction plate 150 and the openings 80 and 37 of the membrane horn switch 22.

Referring to FIGS. 1–8, the membrane horn switch assembly 10 of the present invention advantageously allows for a minimal compression of the steering wheel cover 12 before actuation of the membrane horn switch 22 and the subsequent sounding of the vehicle horn. Therefore, parts stored in the hub of the steering wheel can be closely situated and extremes in temperature would not actuate a vehicle's horn. In another aspect, the membrane horn switch assembly 10 has a predetermined datum scheme to register the switch contact points 140 so that the first and second concentrators 90, 92 are properly orientated relative to the conductive positive and negative grids 48, 50. This method of registration eliminates dielectric interference in the membrane horn switch 22. In addition and advantageously, the membrane horn switch 22 of the present invention is designed so that temperature extremes and inadvertent bumping of the steering wheel cover does not result in the unintentional activation of the membrane horn switch 22.

It will be appreciated that any number of suitable conductive materials may be used in the practice of the present invention including metals such as copper. In other words, the conductive material 28 and the conductive positive and negative grids 48, 50 are formed of suitable conductive materials to provide the desired electrical connections for activation of the born.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A membrane horn switch assembly for operating a horn, comprising:
    a steering wheel cover having an outer portion with a bottom surface and an inner portion with a top surface, the bottom surface and the top surface being in a facing spaced relationship;
    a membrane horn switch disposed between the outer and inner portions of the steering wheel cover, the membrane horn switch including:
    a first conductive grid and a second conductive grid disposed in a first plane, the first and second conductive grids having a different polarity; and
    a conductive material disposed in a second plane facing the first and second conductive grids with a spacer disposed between the conductive material and the first and second conductive grids, the spacer defining a plurality of switch contact points where selective contact between the conductive material and the first and second conductive grids is permitted; and
    a plurality of first concentrators and a plurality of second concentrators depending away from said top surface, the plurality of first concentrators selectively communicating with the first conductive grid and the plurality of second concentrators selectively communicating with the second conductive grid when a force is applied to the outer portion of said steering wheel cover the plurality of first and second concentrators having different lengths so that a force driving the outer portion towards the inner portion causes the plurality of first concentrators to provide a first electrical connection between the conductive material and the first conductive grid prior to the plurality of second concentrators providing a second electrical connection between the conductive material and the second conductive grid which results in activation of the horn.

2. The membrane horn switch assembly according to claim 1, wherein the plurality of first concentrators have a first length and the plurality of second concentrators have a second length, the first length being greater than the second length.

3. The membrane horn switch assembly according to claim 1, wherein the plurality of first and second concentrators are integrally formed with and extend from the top surface of the inner portion of the steering wheel cover.

4. The membrane horn switch assembly according to claim 1, wherein the plurality of first and second concentrators are integrally formed with and extend from the bottom surface of the outer portion of the steering wheel cover.

5. The membrane horn switch assembly according to claim 4, further including:
a plurality of notches formed in the bottom surface of the outer portion of the steering wheel cover, the plurality of notches being disposed between and about the plurality of first and second concentrators.

6. The membrane horn switch assembly according to claim 1, wherein the first conductive grid comprises a conductive positive grid and the second conductive grid comprises a conductive negative grid.

7. The membrane horn switch assembly as in claim 6, wherein the plurality of first and second concentrators are integrally formed with and extend from the top surface of the inner portion of the steering wheel cover.

8. The membrane horn switch assembly according to claim 1, wherein the first conductive grid comprises a conductive negative grid and the second conductive grid comprises a conductive positive grid.

9. The membrane horn switch assembly according to claim 1, further including:
a reaction plate disposed between the inner portion of the steering wheel cover and the membrane horn switch, the first and second concentrators being integrally formed on the reaction plate and extending therefrom.

10. The membrane horn switch assembly according to claim 9, wherein the first concentrators are disposed below the first conductive grid and the second concentrators are disposed below the second conductive grid.

11. The membrane horn switch assembly according to claim 1, wherein the first conductive grid includes a plurality of first conductive arms and the second conductive grid includes a plurality of second conductive arms, the plurality of first and second conductive arms being interleaved with one another.

12. The membrane horn switch assembly as in claim 9, wherein the first conductive grid comprises a conductive positive grid and the second conductive grid comprises a conductive negative grid.

13. The membrane horn switch assembly according to claim 1, wherein the membrane horn switch includes an upper nonconductive sheet having the conductive material disposed on a first surface thereof and a lower nonconductive sheet having the first and second conductive grids formed on a first surface thereof, the first surfaces of the upper and lower nonconductive sheets facing each other.

14. The membrane horn switch assembly according to claim 1, wherein the spacer comprises a dielectric sheet having a plurality of openings formed therein, the plurality of openings partially defining the plurality of switch contact points.

15. The membrane horn switch assembly according to claim 1, wherein the spacer comprises a dielectric ink arranged according to a predetermined pattern, the predetermined pattern defining the plurality of switch contact points where the dielectric ink is absent.

16. The membrane horn switch assembly according to claim 1, wherein the steering wheel cover includes a primary datum feature to locate and position the first and second concentrators relative to the first and second conductive grids and an anti-rotation feature for preventing the switch from unwanted movement within the steering wheel cover.

17. The membrane horn switch assembly according to claim 1, further including:
a reaction plate disposed between the inner portion of the steering wheel cover and the membrane horn switch, the reaction plate including the first and second concentrators extending therefrom, the reaction plate having a primary datum feature to locate and position the first and second concentrators relative to the first and second conductive grids and an anti-rotation feature for preventing the switch from unwanted movement within the steering wheel cover.

18. The membrane horn switch assembly according to claim 14, primary datum feature comprises an opening formed in the reaction plate and the anti-rotation feature comprises a notch formed therein.

19. The membrane horn switch assembly according to claim 1, wherein a first force is needed to drive the outer portion towards the inner portion to form the first electrical connection and a second force applied to the outer portion is needed to form the second electrical connection, the first force being less than the second force.

20. A membrane horn switch assembly for use in a vehicle horn assembly, the membrane horn switch comprising:
a first sheet having a first surface including a conductive material disposed thereon:
a second sheet having a first surface including a first conductive grid and a second conductive grid disposed thereon, the first and second conductive grids having a different polarity, the first surface of the second sheet facing the first surface of the first sheet;
a spacer disposed between the first and second sheets, the spacer defining a plurality of switch contact points where selective contact between the conductive material and the first and second conductive grids is permitted; and
a reaction plate disposed below a second surface of the second sheet, the reaction plate including a plurality of first concentrators and a plurality of second concentrators, the plurality of first concentrators selectively communicating with the first conductive grid and the plurality of second concentrators selectively communicating with the second conductive grid, the plurality of first and second concentrators having different lengths.

21. The membrane horn switch assembly according to claim 20, wherein the plurality of first concentrators has a first length and the plurality of second concentrators has a second length, the first length being greater than the second length.

22. The membrane horn switch assembly according to claim 20, wherein the first conductive grid has a positive polarity and the second conductive grid has a negative plurality, the first conductive grid having a plurality of first arms which are interleaved with a plurality of second arms of the second conductive grid.

23. The membrane horn switch assembly according to claim 20, wherein the first concentrators comprise first elongated members extending from the reaction plate and the second concentrators comprise second elongated members extending from the reaction plate, the first concentrators being orientated below the first conductive grid, the second concentrators being orientated below the second conductive grid.

24. A horn switch assembly for operating a horn, comprising:

a steering wheel cover having an outer portion with a bottom surface and an inner portion with a top surface;

a membrane horn switch, said membrane horn switch comprises:

a first conductive grid and a second conductive grid, said conductive grid being disposed in a first plane, said first conductive grid has an opposite polarity from said second conductive grid;

a conductive material disposed in a second plane, and a nonconductive spacer comprising gaps disposed between said first plane and said second plane;

a first means for contacting a portion of said first conductive grid with said conductive member to create a first electrical connection; and a second means for contacting a portion of said second conductive grid with said conductive material to create a second electrical connection, said second means being positioned further away from said conductive member than said first means.

25. A horn switch assembly for operating a horn, comprising:

a) a steering wheel cover having an outer portion with a bottom surface and an inner portion with a top surface, said bottom surface and said top surface being in a facing spaced relationship;

b) a membrane horn switch disposed between the outer and inner portions of the steering wheel cover, the membrane horn switch including:

i) a first conductive grid and a second conductive grid disposed in a first plane, the first and second conductive grids having a different polarity; and ii) a conductive material disposed in a second plane facing the first and second conductive grids with a nonconductive spacer disposed between the conductive material and the first and second conductive grids, the nonconductive spacer having a plurality of openings; and c) a plurality of first concentrators and a plurality of second concentrators depending away from said top surface, the plurality of first concentrators making contact with a portion of said first conductive grid at a position in close proximity to said plurality of openings and the plurality of second concentrators making contact with a portion of said second conductive grid at a position in close proximity to said plurality of openings, when a force is applied to said outer portion of said steering wheel cover, the plurality of first and second concentrators having different lengths so that a force driving the outer portion towards the inner portion causes the plurality of first concentrators to provide a first electrical connection between the conductive material and the first conductive grid prior to the plurality of second concentrators providing a second electrical connection between the conductive material and the second conductive grid which results in activation of the horn.

* * * * *